(12) United States Patent
Chen et al.

(10) Patent No.: US 11,578,824 B2
(45) Date of Patent: Feb. 14, 2023

(54) CRIMPING TOOL

(71) Applicant: Ridge Tool Company, Elyria, OH (US)

(72) Inventors: LeiHua Chen, Shanghai (CN); Qi Zhou, Shanghai (CN)

(73) Assignee: Ridge Tool Company, Elyria, OH (US)

( * ) Notice: Subject to any disclaimer, the term of this patent is extended or adjusted under 35 U.S.C. 154(b) by 88 days.

(21) Appl. No.: 15/930,703

(22) Filed: May 13, 2020

(65) Prior Publication Data

US 2020/0271249 A1 Aug. 27, 2020

Related U.S. Application Data

(63) Continuation-in-part of application No. 16/247,699, filed on Jan. 15, 2019.

(30) Foreign Application Priority Data

Mar. 26, 2018 (CN) .......................... 201810252543.0

(51) Int. Cl.
*B25B 27/10* (2006.01)
*B21D 39/04* (2006.01)
(Continued)

(52) U.S. Cl.
CPC .......... *F16L 13/141* (2013.01); *B21D 39/048* (2013.01); *B25B 27/10* (2013.01);
(Continued)

(58) Field of Classification Search
CPC .... B21D 39/048; B21D 39/046; B25B 27/10; B25B 13/28; B25B 13/505; B25B 27/146; B25B 27/02; H01R 43/042; B23P 19/02
(Continued)

(56) References Cited

U.S. PATENT DOCUMENTS 8,782,863 B2 * 7/2014 Pfeiffer .................. B25B 27/10
29/237
10,092,942 B2 * 10/2018 Greding ............... B21D 39/048
(Continued)

FOREIGN PATENT DOCUMENTS

CH          693984 A5 *  5/2004
CN         106255560    * 12/2016
(Continued)

OTHER PUBLICATIONS

Certified Copy of Foreign Priority Application 201810252543.0 (Year: 2018).*
Office Action dated Nov. 14, 2019; App No. DE102019201110.1; 8 pages.

*Primary Examiner* — Mahdi H Nejad
(74) *Attorney, Agent, or Firm* — Mark E. Bandy; Rankin Hill & Clark, LLP

(57) ABSTRACT

A crimping tool is described comprising a first crimping member, a second crimping member, at least one intermediate crimping member, a first sliding member and a second sliding member. The free ends of the first crimping member and the second crimping member form an opening of the crimping tool. The first crimping member, the at least one intermediate crimping member, and the second crimping member are sequentially hinged together via connecting devices. The first sliding member is slidably disposed on the free end of the first crimping member. The second sliding member is slidably disposed on the free end of the second crimping member. The first sliding member is adjacent to the second sliding member. The inner sides of the first crimping member, the at least one intermediate crimping member, the second crimping member, the first sliding member, and the second sliding member are formed to be pressed with the workpiece to be crimped. The crimping tool has a simple structure and good crimping performance, so that the work- (Continued)

piece is uniformly stressed and burrs on the workpiece can be reduced.

41 Claims, 12 Drawing Sheets

(51) Int. Cl.
 *F16L 13/14* (2006.01)
 *B25B 27/14* (2006.01)
 *B25B 27/02* (2006.01)
(52) U.S. Cl.
 CPC ............ *B21D 39/046* (2013.01); *B25B 27/02* (2013.01); *B25B 27/146* (2013.01); *F16L 2013/145* (2013.01)
(58) Field of Classification Search
 USPC .............................................. 29/237; 72/416
 See application file for complete search history.

(56) References Cited

U.S. PATENT DOCUMENTS

| 2003/0046973 | A1* | 3/2003 | Hamm | B21D 39/04 72/452.8 |
| 2003/0230130 | A1* | 12/2003 | Bowles | B25B 27/10 72/416 |
| 2013/0174395 | A1* | 7/2013 | Kim | B21D 39/048 29/282 |
| 2019/0291165 | A1* | 9/2019 | Chen | B25B 27/10 |

FOREIGN PATENT DOCUMENTS

| CN | 106255560 A | * | 12/2016 |
| CN | 106255560 A | | 12/2016 |
| DE | 4240427 C1 | | 1/1994 |
| DE | 102009032113 A1 | | 1/2011 |
| DE | 1 02014115358 A1 | | 4/2016 |
| WO | WO2012015194 A2 | | 2/2012 |
| WO | WO 2017/188717 | | 11/2017 |

* cited by examiner

CRIMPING TOOL

CROSS REFERENCES TO RELATED APPLICATIONS

This application is a continuation-in-part (CIP) application of U.S. Ser. No. 16/247,699 filed Jan. 15, 2019, which claims priority from Chinese application No. 201810252543 filed on Mar. 26, 2018.

FIELD

The present disclosure relates to a crimping tool, and more particularly to a crimping tool for crimping a tubular member. The present disclosure also relates to multiple segment crimping rings, and in particular, two and five segment crimping rings.

BACKGROUND

Pipe fittings are commonly used components in conveying systems for transporting fluids such as water, oil, and the like. A crimping tool is often used to crimp and lock the fitting interface when connecting the fittings. In order to ensure the reliability and/or sealing of the pipe connection, a crimping tool that uniformly applies force to the pipe and has a simplified structure is desired.

A crimping tool is known in the prior art that includes two semi-circular crimp members. The two semi-circular crimp members are coupled via a hinge shaft such that the two semi-circular crimp members are rotatable about the hinge shaft. A space (also referred to as a crimping space) for accommodating a workpiece to be crimped (e.g., a tubular member) is defined between the inner sides of the two semi-circular crimping members. This crimping tool performs a crimping operation when the two semicircular crimping members are rotated toward each other centering on the hinge shaft. During the crimping operation, the portion of the crimping tool that is adjacent to the hinged shaft exerts a greater pressure on the workpiece, while the open portion of the crimping tool that is remote from the hinged shaft exerts less pressure on the tubular member. Since the tube is unevenly stressed, it is deformed from a portion with a large force toward a portion with a small force to be non-circular. Moreover, wrinkles (or may be referred to as burrs) appear at the position of the tubular member adjacent to the opening portion of the crimping tool, which affects the reliability and/or sealing of the tubular connection.

Another crimping tool is known in the art that includes an inner laminate ring and an outer laminate ring. The outer laminate ring includes a plurality of outer laminate members that are hingedly joined together. The inner laminate ring includes a plurality of inner laminate members joined to the outer laminate ring and slidable relative to the outer laminate ring. For such a crimping tool, the number of crimping members is large, the structure is complicated, and the manufacturing and assembly costs are high.

Therefore, there is still room for improvement in the crimping performance of the crimping tool.

SUMMARY

The difficulties and drawbacks associated with previous approaches are addressed in the present subject matter as follows.

In one aspect, the present subject matter provides a crimping tool comprising a first crimping member having a first free end. The crimping tool also comprises a second crimping member having a second free end, the first free end and the second free end forming an opening of the crimping tool. The crimping tool also comprises at least one intermediate crimping member. The first crimping member, the at least one intermediate crimping member, and the second crimping member are sequentially hinged together via connecting devices. The crimping tool also comprises a first sliding member slidably disposed on the first free end of the first crimping member. The crimping tool also comprises a second sliding member slidably disposed on the second free end of the second crimping member.

In another aspect, the present subject matter provides a crimping tool comprising a first crimping member having a first free end and a second crimping member having a second free end. The first free end and the second free end form an opening of the crimping tool. The crimping tool also comprises a first intermediate crimping member, a second intermediate crimping member, and a third intermediate crimping member. The first crimping member, the first intermediate crimping member, the third intermediate crimping member, the second intermediate crimping member, and the second crimping member are sequentially hinged together via connecting devices. The crimping tool also comprises a first sliding member. The first sliding member is slidably disposed on the first free end of the first crimping member. The crimping tool also comprises a second sliding member slidably disposed on the second free end of the second crimping member. The first sliding member is adjacent or substantially so, to the second sliding member. The first crimping member, the first intermediate crimping member, the third intermediate crimping member, the second intermediate crimping member, the second crimping member, the first sliding member and the second sliding member form an active surface that contacts a workpiece to be pressed.

In another aspect, the present subject matter provides a crimping tool comprising a first crimping member and a second crimping member adjacent to the first crimping member. The adjacent corresponding ends of the first crimping member and the second crimping member are hinged together via a connecting device. The crimping tool also comprises a first sliding member. The first sliding member is slidably disposed on the first crimping member on a free end of the first crimping member. The crimping tool additionally comprises a second sliding member slidably disposed on a free end of the second crimping member. The first sliding member is adjacent or substantially so, to the second sliding member. The first crimping member, the second crimping member, the first sliding member and the second sliding member form an active surface that contacts a workpiece to be crimped.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Figure 1:
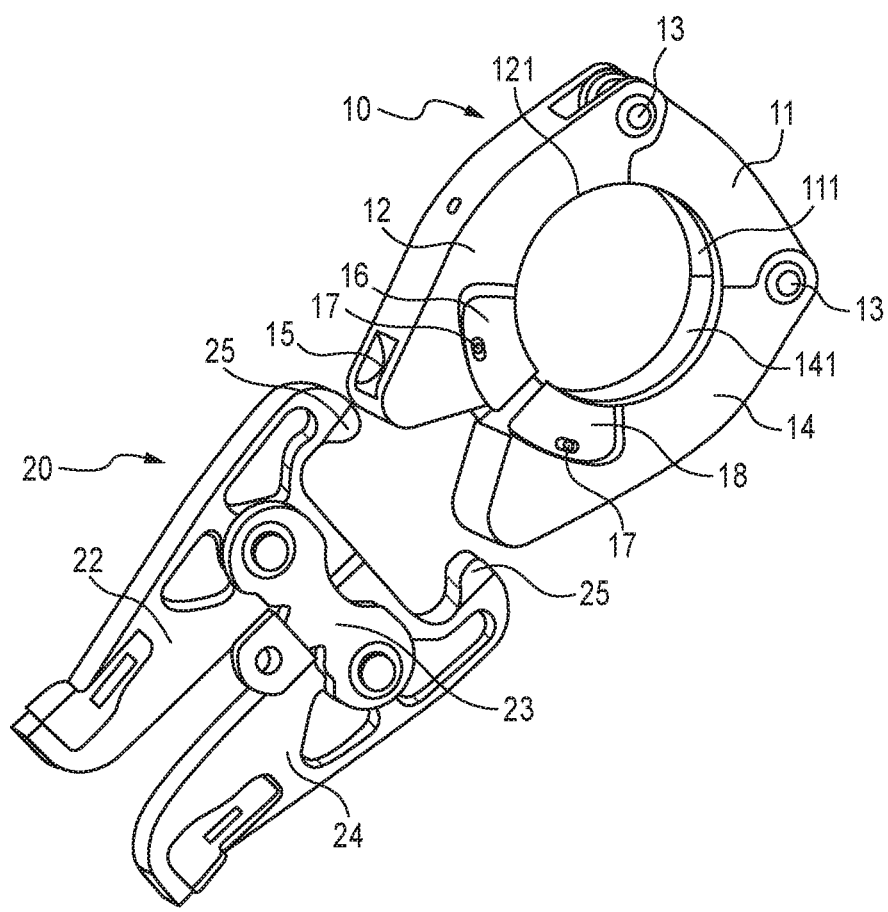
FIG. 1 is a perspective schematic view of a crimping tool and a driving device in accordance with an embodiment of the present disclosure.

In one aspect, the present subject matter provides a crimping tool comprising a first crimping member having a first free end. The crimping tool also comprises a second crimping member having a second free end. The first free end and the second free end form an opening of the crimping tool. The crimping tool also comprises at least one intermediate crimping member. The first crimping member, the at least one intermediate crimping member, and the second crimping member and are sequentially hinged together via connecting devices. The crimping tool also comprises a first sliding member, the first sliding member being slidably disposed on the first free end of the first crimping member. The crimping tool also comprises a second sliding member slidably disposed on the second free end of the second crimping member. The first sliding member is adjacent to the second sliding member. The first crimping member, the at least one intermediate crimping member, the second crimping member, the first slide member and the second slide member form an active surface that contacts a workpiece to be pressed.

In another aspect, the present subject matter provides a crimping tool comprising a first crimping member, and a second crimping member adjacent to the first crimping member. Adjacent corresponding ends of the first crimping member and the second crimping member are hinged together via a connecting device. The crimping tool also comprises a first sliding member. The first sliding member is slidably disposed on the first crimping member on a free end of the first crimping member. The crimping tool also comprises a second sliding member slidably disposed on a free end of the second crimping member. The first sliding member is adjacent to the second sliding member. And the first crimping member, the second crimping member, and the inner sides of the first sliding member and the second sliding member form an active surface that mates and engages the workpiece to be crimped.

It is an object of one or more embodiments of the disclosure to provide a crimping tool that is structurally simplified and has good crimping properties.

Another object of one or more embodiments of the present disclosure is to provide a crimping tool that is capable of preventing or reducing burrs formed on a workpiece.

Yet another object of one or more embodiments of the present disclosure is to provide a crimping tool that is capable of applying uniform pressure to the workpiece.

In order to achieve one or more of the above objects, according to an aspect of the present disclosure, a crimping tool is provided in which the crimping tool includes a first crimping member, a second crimping member, at least one intermediate crimping member, a first sliding member, and a second sliding member. The free ends of the first crimping member and the second crimping member form an opening of the crimping tool. The first crimping member, the at least one intermediate crimping member, and the second crimping member are sequentially hinged together via a connecting device. The first sliding member is slidably disposed on a free end of the first crimping member. The second sliding member is slidably disposed on a free end of the second crimping member. The first sliding member is adjacent to the second sliding member. The first crimping member, the at least one intermediate crimping member, the second crimping member, the first sliding member, and the second sliding member form an active surface that contacts a workpiece to be crimped. The inner side surfaces of the two sliding members form the active surface that matches and engages the workpiece to be crimped.

According to the above described crimping tool of the present disclosure, since each of the sliding members is provided on a corresponding crimping member, the sliding member can contact the workpiece earlier and apply pressure to the workpiece, so that the force of the workpiece is relatively uniform, and burr generation is reduced. Further, since each of the sliding members is provided only on the end of a corresponding crimping member (i.e., the first crimping member and the second crimping member) forming the crimping tool, the crimping tool of the present disclosure has a simple structure.

In some examples, the inner sides of the first crimping member, the second crimping member, the at least one intermediate crimping member, the first sliding member, and the second sliding member form a substantially circular shape surface. In this example, the crimping tool is particularly suitable for crimping a workpiece such as a tubular member having a circular cross section.

In some examples, the first sliding member is configured to be slidable in a circumferential direction relative to the first crimping member, and the second sliding member is configured to be engageable relative to the second crimping member. And in certain examples, both of the first and second sliding members are configured to be slidable in a circumferential direction relative to a corresponding crimping member, i.e., the first crimping member and the second crimping member. And in still other examples, both of the first and second sliding members are configured to be engageable relative to a corresponding crimping member.

In some examples, the first sliding member is configured to be adaptively rotatable relative to the first crimping member while sliding in the circumferential direction such that the entire inner side of the first sliding member is basically engaged and in contact with the workpiece. The second sliding member is configured to be adaptively rotatable relative to the second crimping member while sliding in the circumferential direction such that the entire inner side of the second sliding member substantially conforms to the workpiece engagement and contact. Such crimping tools have better crimping properties.

In some examples, the attachment or connecting device includes a hinge pin and an elastic member. The first crimping member, the at least one intermediate crimping member, and the second crimping member are each provided with a through hole for inserting the hinge pin. The elastic member is configured to apply a biasing force to the first crimping member, the at least one intermediate crimping member, and the second crimping member toward their initial positions.

In some examples, the first crimping member may have the same structure as the second crimping member. The first sliding member may have the same structure as the second sliding member. In this way, the manufacturing cost and assembly cost of each of the crimping members and the respective sliding members can be reduced. Further, the at least one intermediate crimping member may have a different structure from the first crimping member and the second crimping member.

In some examples, the first crimping member and the second crimping member are provided with rails or grooves, and the first sliding member and the second sliding member can be provided with provisions to engage the rail or the groove, or a guide that is grooved.

In some examples, the rail of each of the crimping members has a mating face that is in sliding contact with the bottom surface of the groove of each of the sliding members.

In some examples, the mating face of each crimping member and the bottom face of each sliding member are curved surfaces.

In some examples, the curvature of the mating face of the guide rail or the bottom surface of the groove provided on the first crimping member and/or the second crimping member is greater than, less than, or equal to the curvature of the first sliding member and/or the second sliding member.

In some examples, the curvature of the mating face and/or the bottom face is constant.

In some examples, the curvature of the mating face and/or the bottom face is varied.

In some examples, the crimping tool further includes a pin configured to connect the first sliding member and the second sliding member to the respective first crimping member and second crimping member. One of the first crimping member and the first sliding member is provided with a hole for receiving and holding the pin, and the other of the first crimping member and the first sliding member is provided with a hole for receiving and holding the pin. There may be provided elongated holes that allow the pin to move therein. One of the second crimping member and the second sliding member is provided with a hole for receiving and holding the pin, and the other of the second crimping member and the second sliding member provided with a hole for receiving and holding the pin. There may be provided elongated holes that allow the pin to move therein.

In some examples, the crimping tool includes only one pin for each of the first sliding member and the second sliding member such that the first sliding member and the second sliding member are under pressure. The workpiece can be adaptively rotated about the pin when it is attached. In this way, the inner side surface of the first and second sliding members can be brought into good contact and engagement with the workpiece, and the workpiece can be evenly stressed.

In some examples, the pin is configured to define an initial position of the first sliding member and the second sliding member when the workpiece is not crimped.

In some examples, the crimping tool further includes a biasing member configured to bias the tool toward an initial position for each of the first sliding member and the second sliding member.

In some examples, each of the first crimping member and the second crimping member is provided with a respective member for receiving and retaining the biasing member.

In some examples, the crimping tool is configured to have a predetermined gap between the first sliding member and the second sliding member when the workpiece is not crimped, or rather prior to a crimping operation. The inner side surfaces of the first crimping member, the first sliding member, the second sliding member, the second crimping member, and the at least one intermediate crimping member form a continuous active surface. Such a crimping tool can reduce the generation of burrs.

In some examples, the crimping tool further includes a drive joint disposed on each of the first crimping member and the second crimping member for engaging a drive device.

In some examples, the drive joint or drive engagement portion is in the form of a recess or in the form of a protrusion.

According to another aspect of the present disclosure, a crimping tool is provided. The crimping tool includes a first crimping member, a second crimping member, a first sliding member, and a second sliding member. Adjacent ends of the first crimping member and the second crimping member are hinged together via a connecting device. The first sliding member is slidably disposed on a free end of the first crimping member. The second sliding member is slidably disposed on a free end of the second crimping member. The first sliding member is adjacent to the second sliding member. The inner side surfaces of the first crimping member, the second crimping member, the first sliding member, and the second sliding member form an active surface that matches and engages the workpiece to be crimped.

Other application areas will become apparent from the description provided herein. It is understood that the specific examples and embodiments described herein are for the purpose of illustration.

The working principle of the crimping tool 10 according to an embodiment of the present disclosure will be described below with reference to the noted figures.

FIG. 1 shows a crimping tool 10 and a drive unit or driving device 20. The crimping tool 10 is coupled to the drive unit 20 and is driven by the drive unit to crimp a workpiece. The crimping tool 10 includes a recess 15 that is combined with the projection 25 of the drive unit 20. The recess 15 of the crimping tool 10 constitutes a drive joint that engages with the drive unit 20. The protruding portion 25 of the driving device 20 constitutes a driving portion for driving the crimping tool 10. It should be understood that the driving engagement portion of the crimping tool 10 is not limited to the illustrated structure, but may be varied depending on the driving portion of the driving device 20.

As shown in FIG. 1, the drive unit 20 includes a first drive arm 22 and a second drive arm 24. The first drive arm 22 and the second drive arm 24 are coupled together by a connecting device 23 and are rotatable relative to the connecting device 23. Protrusions 25 for engaging and driving the crimping tool 10 are provided on the distal ends of the first drive arm 22 and the second drive arm 24.

The crimping tool 10 includes a first crimping member 12, a second crimping member 14, and an intermediate crimping member 11 disposed between the first crimping member 12 and the second crimping member 14. The first crimping member 12 and the second crimping member 14 are end crimping members of the crimping tool 10 and form an opening of the crimping tool 10. In other words, the adjacent ends of the first crimping member 12 and the second crimping member 14 are not joined together, but may be moved toward each other or away from each other to close or open the crimping tool 10. The first crimping member 12 and the second crimping member 14 are each coupled to the intermediate crimping member 11 via a connecting device 13. The first crimping member 12, the second crimping member 14, and the intermediate crimping member 11 are each rotatable about corresponding connecting devices 13. The first crimping member 12, the second crimping member 14, and the intermediate crimping member 11 define a space (which may also be referred to as "a crimping space") for accommodating a workpiece to be crimped.

The drive device 20 is coupled to the crimping tool 10 by engaging the projections 25 of the drive device 20 with the recesses 15 of the crimping tool 10. When the projections 25 drive the recesses 15 to move toward each other, the first crimping member 12 and the second crimping member 14 are brought toward each other to crimp the workpiece. When the projections 25 move away from each other, the first crimping member 12 and the second crimping member 14 return to their original positions, whereby the crimped workpiece can be taken out.

The term "initial position" as used herein refers to the position of the various components of the crimping tool 10 when crimping is not performed and more particularly prior to a crimping operation. The term "clamping completion position" as used herein refers to the position of the various components of the crimping tool 10 at the end of crimping a workpiece.

Figure 3:
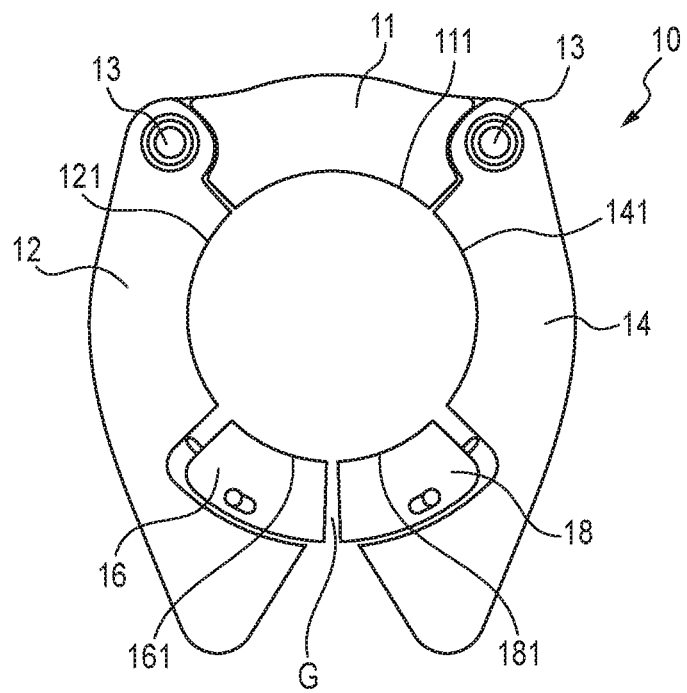
FIG. 3 is a plan view showing the crimping tool of FIG. 1 in an initial state.
Figure 4:
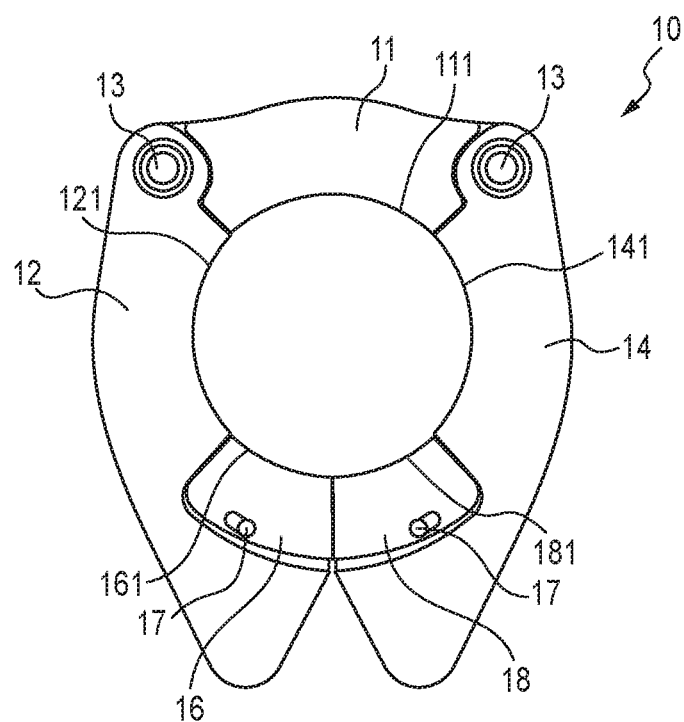
FIG. 4 is a schematic plan view showing the crimping tool of FIG. 1 in a state in which the crimping is completed.

As described above, the first crimping member 12 and the second crimping member 14 surround the corresponding connecting device 13 with respect to the intermediate crimping member 11 at an initial position (as shown in FIG. 3) and a crimping completion position (as shown in FIG. 4). Rotation between these positions achieves a crimping of the workpiece.

As described above, the crimping tool 10 includes the first crimping member 12 and the second crimping member 14, which each surround the connecting device 13 with respect to the intermediate crimping member 11 at an initial position (as shown in FIG. 3) and a crimping completion position (as shown in FIG. 4). As noted, rotation between these positions achieves a crimping of the workpiece.

As described above, the crimping tool 10 includes the first crimping member 12, the second crimping member 14, and the intermediate crimping workpiece 11. Further, the crimping tool 10 according to the present embodiment further includes a first sliding member 16 disposed on the first crimping member 12 and a second sliding member 18 disposed on the second crimping member 14.

Referring to FIGS. 2 to 7, an end portion 122 of the first crimping member 12 is coupled to an end portion 112 of the intermediate crimping member 11 via a connecting device 13. The first sliding member 16 is positioned on a free end 124 of the first crimping member 12 remote from the connecting device 13 and slidable relative to the first crimping member 12. An end portion 142 of the second crimping member 14 is connected to another end portion 114 of the intermediate crimping member 11 via a connecting device 13. The second sliding member 18 is positioned on a free end 144 of the second crimping member 14 remote from the connecting device 13 and slidable relative to the second crimping member 14.

The crimping members 11, 12, 14, the sliding members 16 and 18, and corresponding inner sides 111, 121, 141, 161, 181 of the crimping and sliding members together define an active surface (or crimping region) that mates and engages the workpiece to be crimped. The structure of the active surface (or crimping area) can be determined according to the structure of the workpiece to be crimped. In the illustrated example, the workpiece to be crimped is a tubular member having a circular outer surface, and thus, the inner sides of the crimping members 11, 12, 14 and the sliding members 16, 18 define a substantially circular active surface (or pressure) connected area, as shown in FIGS. 3 and 4. It should be understood that the crimping tool according to the present disclosure is not limited to crimping a tubular member having a circular cross section.

The first sliding member 16 is adjacent to the second sliding member 18. When the crimping tool 10 is in the initial position at which the workpiece is not crimped, the distance between the first sliding member 16 and the second sliding member 18 is smaller than the distance between the free end 124 of the first crimping member 12 and the free end 144 of the second crimping member 14. Thus, when the workpiece to be crimped is placed in the crimping space defined by the crimping members 11, 12, 14 and the sliding members 16, 18, although the free end 124 of the first crimping member 12 is moved toward the free end 144 of the second crimping member 14, the free ends 124, 144 of the members 12, 14 do not abut or close. However the sliding members 16, 18 will contact the workpiece, thereby applying a more uniform pressure to the workpiece.

When the crimping tool 10 crimps a workpiece, the first sliding member 16 and the second sliding member 18 are brought toward each other as the first crimping member 12 and the second crimping member 14 are brought closer together. The end portion 122 of the first crimping member 12 is moved substantially in the circumferential direction, and the second sliding member 18 is moved substantially toward the end portion 142 of the second crimping member 14 in the circumferential direction. Similarly, the end portion 142 of the second crimping member 14 is moved substantially in the circumferential direction, and the first sliding member 16 is moved substantially toward the end portion 122 of the first crimping member 12 in the circumferential direction. Thus, the crimping tool 10 according to the present disclosure can prevent or reduce burrs formed on the workpiece as compared with prior art crimping tools without a sliding member. To this end, it is preferable that a gap G exists between the first sliding member 16 and the second sliding member 18 when the crimping tool 10 is in the initial position as shown in FIG. 3. When the crimping tool 10 is in the crimping completion position as shown in FIG. 4, the crimping members 12, 14 and the sliding members 16, 18 abut each other to form a substantially continuous active surface.

In the crimping tool 10 according to the present disclosure, only two sliding members 16 and 18 are included, which are respectively disposed on the two crimping members 12 and 14 forming the opening of the crimping tool. Therefore, the crimping tool 10 according to the present disclosure has a simple structure and can improve the crimping performance.

The connecting device 13 is configured to connect adjacent crimp members together to form the crimping tool 10 and to allow the crimp members to rotate toward one another or away from each other.

Figure 5:
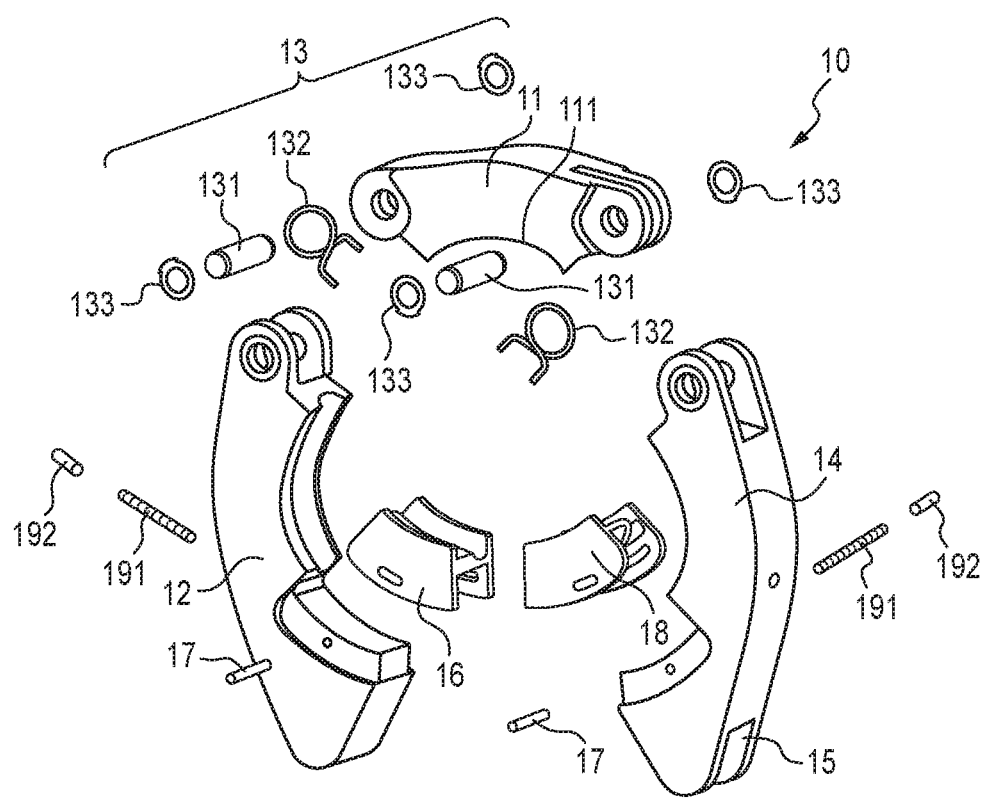
FIG. 5 is an exploded perspective view of the crimping tool of FIG. 1.

Referring to FIG. 5, the connecting device 13 includes a hinge pin 131, a torsion spring 132, and one or more collar(s) 133. The hinge pin 131 is configured to be inserted into a through hole of an adjacent crimping member to pivotally engage adjacent crimping members (described in detail below). The torsion spring 132 is configured to hold the crimping member at an initial position and apply a biasing force to the crimping member to return to the initial position when the crimping member is deviated from the initial position. Therefore, the torsion spring can also be referred to as an "elastic member" or a "biasing member." The collar 133 is configured to prevent the hinge pin 131 from coming off or separating from the crimping member, and thus may also be referred to as a "holding member."

In the illustrated example, the torsion spring 132 is positioned substantially at the center of the hinge pin 131 and has ends that respectively engage the crimping members. The collar 133 is located at both ends of the hinge pin 131.

It should be understood that the connecting device according to the present disclosure is not limited to the illustrated examples, but may have any suitable structure for implementing the above noted functions.

Figure 7A:
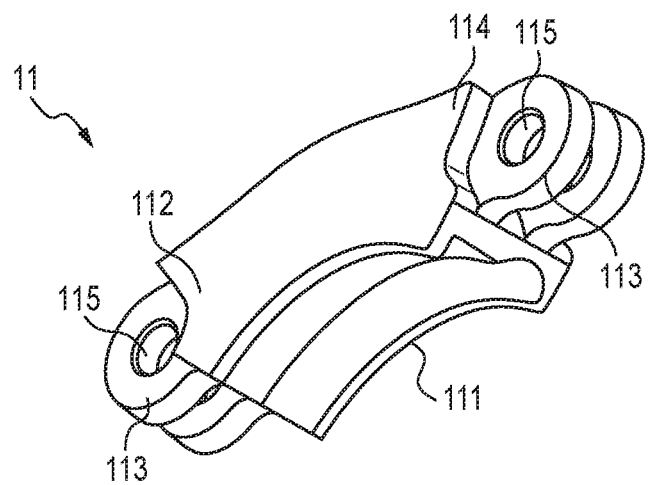
FIG. 7A is a perspective schematic view of an intermediate crimping member of a crimping tool in accordance with an embodiment of the present disclosure.
Figure 7B:
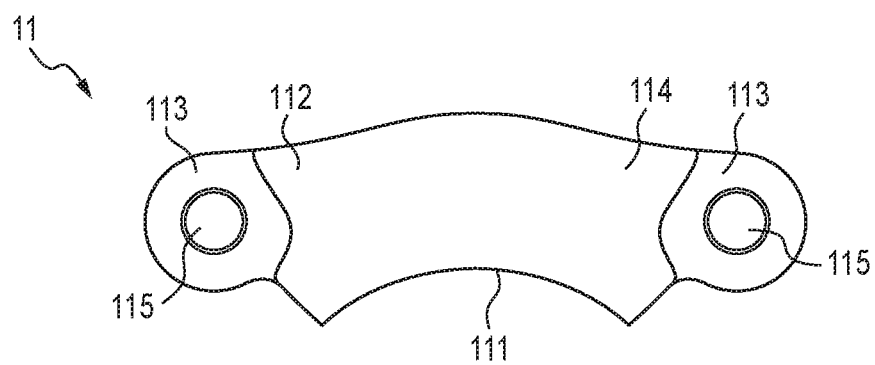
FIG. 7B is an elevational view of the intermediate crimping member of FIG. 7A.
Figure 7C:
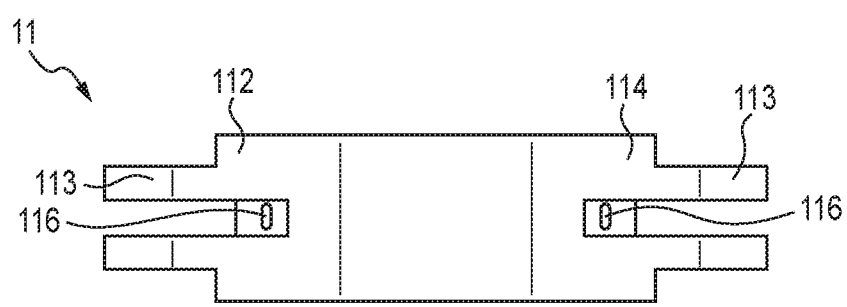
FIG. 7C is another elevational view of the intermediate crimping member of FIG. 7A.

The intermediate crimping member 11 according to an embodiment of the present disclosure will be described in detail below with reference to FIGS. 7A through 7C.

The intermediate crimping member 11 is disposed between the first crimping member 12 and the second crimping member 14. The intermediate crimping member 11 has a body that extends generally in a circumferential direction, the body having an inner side 111 that mates and engages a workpiece to be crimped. In the illustrated example, the workpiece to be crimped is a tubular member, and therefore, the inner side surface 111 has a circular arc shape. However, it will be understood that the shape of the inner side surface 111 may vary depending on the contour in the workpiece to be crimped.

In the circumferential direction, the intermediate crimping member 11 includes a first end portion 112 that is coupled to the first crimping member 12 and a second end portion 114 that is coupled to the second crimping member 14. The intermediate crimping member 11 is symmetrical about a center line in the radial direction. Therefore, only the first end portion 112 will be described below.

In the illustrated example, the intermediate crimping member 11 further includes two lugs 113 extending in parallel from the first end portion 112 in the circumferential direction. The lug 113 is configured to engage with the attachment device 13. Therefore, the structure of the lug 113 can vary depending on the connecting device 13.

A through hole 115 for receiving the hinge pin 131 is provided on the lug 113 of the intermediate crimping member 11. A blind hole 116 for receiving one end of the torsion spring 132 may also be disposed on the first end portion 112 and the second end portion 114 of the intermediate crimping member 11 (see also FIGS. 6A and 6B).

Figure 8A:
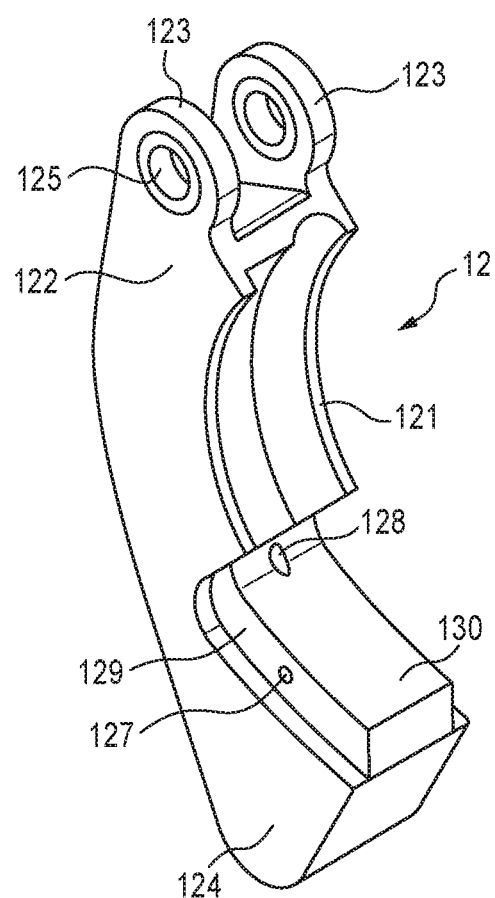
FIG. 8A is a perspective schematic view of a terminal crimping member of a crimping tool in accordance with an embodiment of the present disclosure.
Figure 8B:
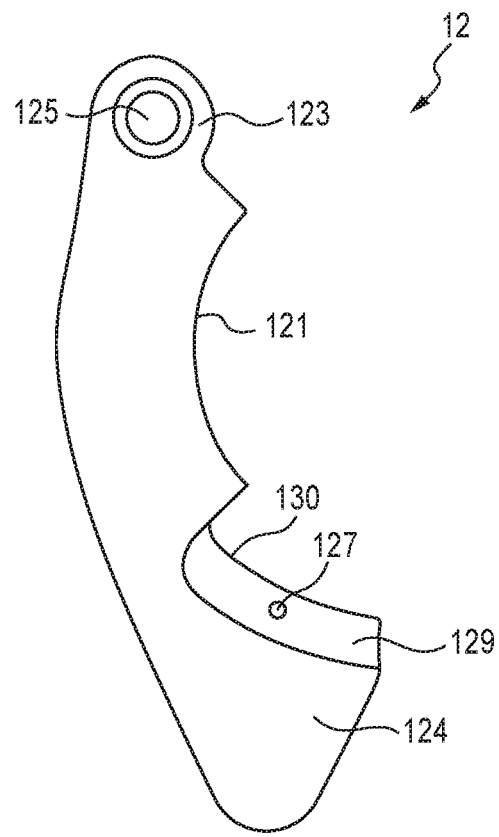
FIG. 8B is an elevational view of the end crimping member of FIG. 8A.
Figure 8C:
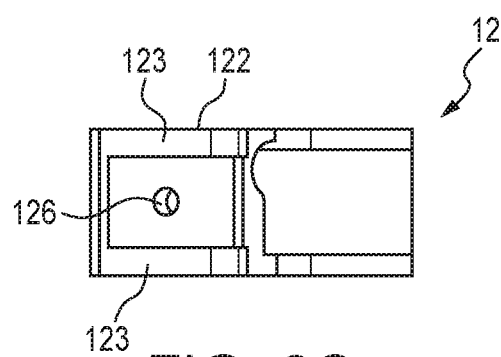
FIG. 8C is another elevational view of the end crimping member of FIG. 8A.

FIGS. 8A to 8C show the first crimping member 12 as a terminal crimping member. The second crimping member 14 has the same structure as the first crimping member 12 and is arranged in a mirror symmetrical manner with respect to the first crimping member 12. Therefore, the first crimping member 12 will be described below as an example, and the second crimping member 14 will not be described.

As shown, the first crimping member 12 has a body that extends generally in a circumferential direction, the body having an inner side 121 that mates and engages a workpiece to be crimped. In the illustrated example, the workpiece to be crimped is a tubular member, and therefore, the inner side surface 121 has a circular arc shape. However, it should be understood that the shape of the inner side surface 121 may vary depending on the contour of the workpiece to be crimped.

In the circumferential direction, the first crimping member 12 includes a first end 122 that is coupled to the intermediate crimping member 11 and a second end (also referred to as a "free end") 124 that is opposite the first end 122.

In the illustrated example, the first crimping member 12 further includes two lugs 123 extending in parallel from the first end portion 122 in the circumferential direction. Each lug 123 is configured to engage with the attachment device 13. Therefore, the structure of the lug 123 can vary depending on the connecting device 13.

A through hole 125 for receiving the hinge pin 131 is disposed on the lug 123 of the first crimping member 12. A recess for accommodating the collar 133 may be provided around the through hole 125. A blind hole 126 for receiving the other end of the torsion spring 132 may also be disposed on the first end portion 122 of the first crimping member 12 (see also FIGS. 6A and 6B).

Figure 2:
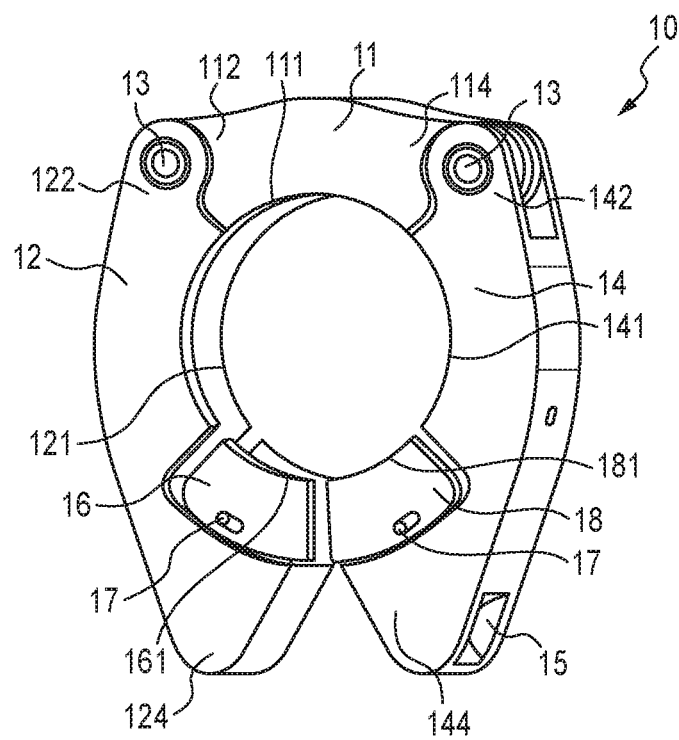
FIG. 2 is another perspective view of the crimping tool of FIG. 1.

The outer side surface of the second end portion 124 of the first crimping member 12 is provided with a recess 15 for engaging the projection 25 of the driving device 20 (see FIGS. 1 and 2). The first crimping member 12 also includes a track or rail 129 that projects radially inward from the inner side of the second end 124. The rail 129 does not extend beyond the inner side 121 of the first crimping member 12 for engaging the workpiece. The rail 129 extends in the longitudinal direction (or circumferential direction) of the first crimping member 12 to allow the first sliding member 16 to slide substantially in the circumferential direction. The rail 129 is configured to engage with a recess 169 of the first sliding member 16 (see FIG. 9A). Thereby, the inner side surface of the rail 129 forms a mating surface 130 that is in sliding contact with the first sliding member 16.

A hole 127 for receiving and holding a pin 17 (see FIGS. 1 to 6B) is provided in the rail 129. The pin 17 can be, for example, a spring pin. The first sliding member 16 is mounted to the first crimping member 12 by the pin 17. Similarly, the second sliding member 18 is mounted to the second crimping member 14 by another pin 17.

Figure 6A:
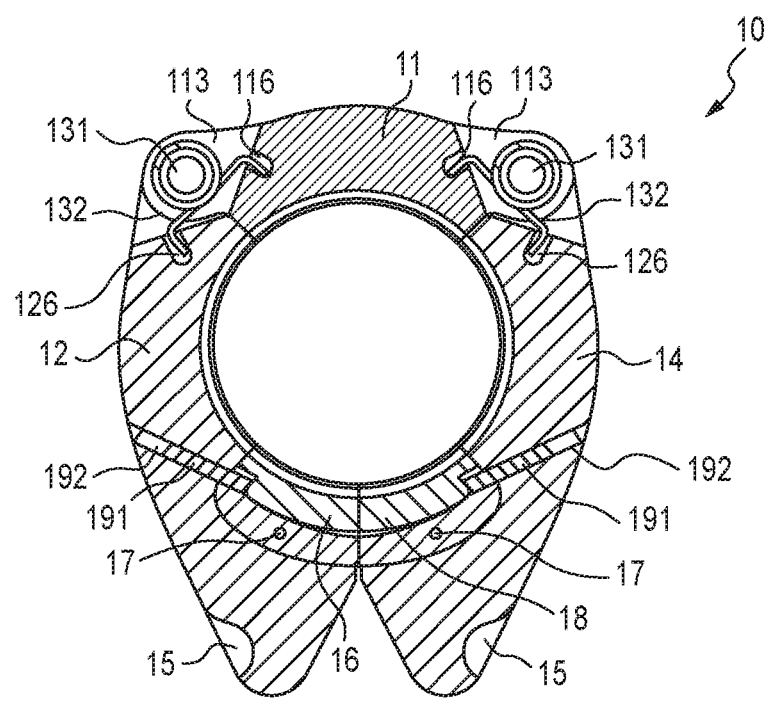
FIG. 6A is a schematic cross-sectional view of the crimping tool of FIG. 1 with the crimping tool in a crimped-to-clamp position.
Figure 6B:
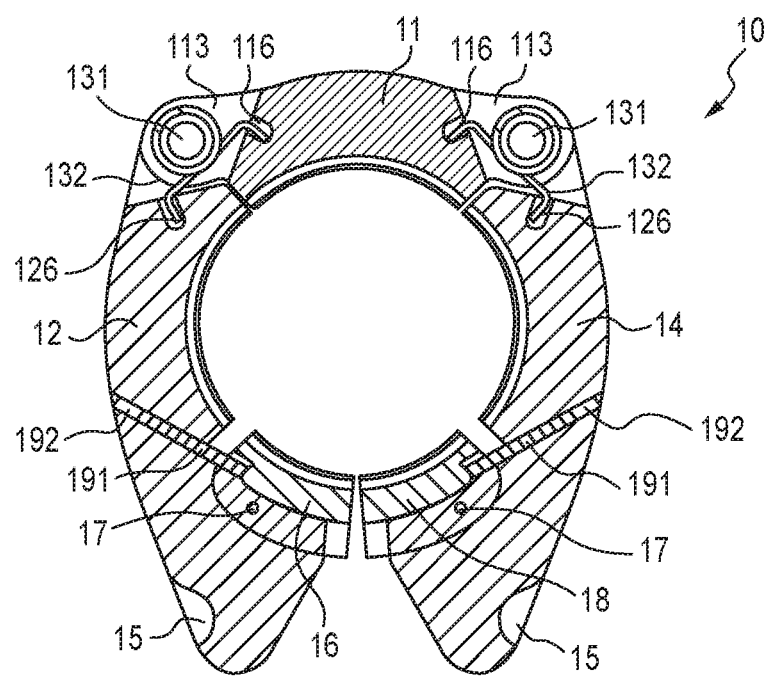
FIG. 6B is a schematic cross-sectional view of the crimping tool of FIG. 1 with the crimping tool in an initial position.

The first crimping member 12 is further provided with an aperture (also referred to as a "receiving portion") 128 for receiving a biasing member 191 that applies a biasing force to the first sliding member 16. As shown in FIGS. 5, 6A, and 6B, the biasing member 191 can be a spring. In order to retain the biasing member 191 in the aperture 128, a plug 192 may be fixedly disposed in one end of the aperture 128. One end of the biasing member 191 is connected to the first sliding member 12, and the other end is connected to the plug 192. The biasing member 191 is configured to bias the first sliding member 12 in an initial position. In other words, when the workpiece is crimped, the first sliding member 12 is returned to its original position by the biasing member 191.

Figure 9A:
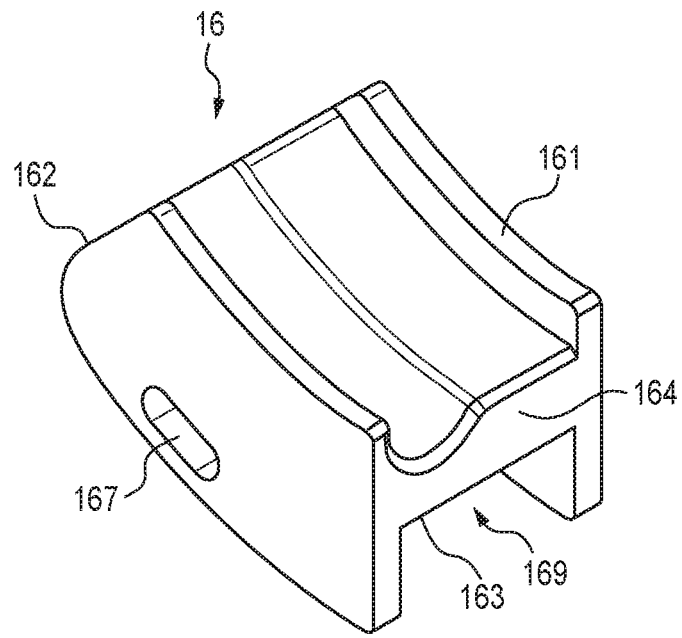
FIG. 9A is a perspective schematic view of a sliding member of a crimping tool in accordance with an embodiment of the present disclosure.
Figure 9B:
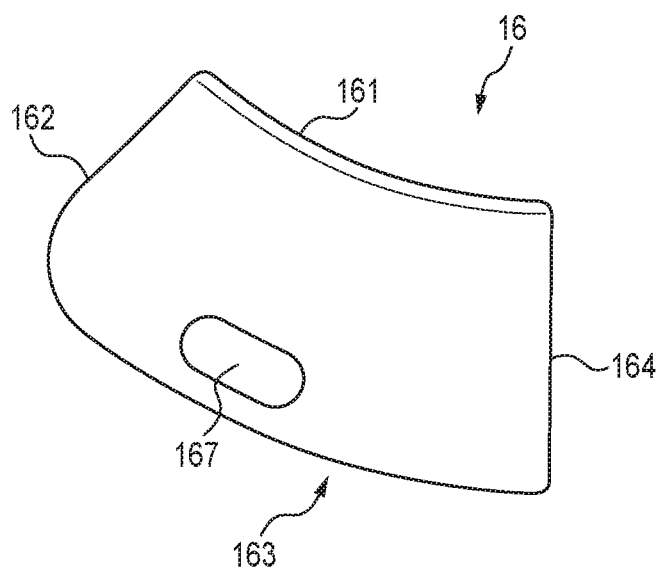
FIG. 9B is an elevational view of the sliding member of FIG. 9A.

FIGS. 9A and 9B illustrate a first sliding member 16 in accordance with an embodiment of the present disclosure. The second sliding member 18 has the same structure as the first sliding member 16 and is arranged in a mirror symmetrical manner with respect to the first sliding member 16. Therefore, the first sliding member 16 will be described below as an example, and the second sliding member 18 will not be described.

As shown, the first sliding member 16 has a body that extends generally in a circumferential direction, the body having an inner side 161 that mates and engages a workpiece to be crimped. In the illustrated example, the workpiece to be crimped is a tubular member, and therefore, the inner side surface 161 has a circular arc shape. However, it should be understood that the shape of the inner side surface 161 may vary depending on the contour of the workpiece to be crimped.

The first sliding member 16 also includes an elongated aperture or hole 167 for receiving the pin 17. The elongated hole 167 extends substantially in the circumferential direction to allow the first sliding member 16 to slide in the circumferential direction with respect to the first crimping member 12.

In the circumferential direction, the first sliding member 16 further includes a first end surface 162 that abuts the first crimping member 12 and a second end surface 164 that abuts the second sliding member 18 at the end of the crimping of the workpiece.

On the side opposite the inner side 161, the first sliding member 16 further includes a recess or groove 169 for engaging the rail 129 of the first crimping member 12. The groove 169 has a bottom surface 163 that is in sliding contact with the mating surface 130 of the rail 129. The bottom surface 163 and the mating surface 130 are curved surfaces. In one example, the curvature of the bottom surface 163 can be the same and constant as the curvature of the mating surface 130. In another example, the curvature of the bottom surface 163 can be constant and greater than the curvature of the mating surface 130, thereby allowing the bottom surface 163 to rotate relative to the mating surface 130 so that the sliding member 16 can better engage and contact the workpiece, such that the workpiece is more stressed evenly. In another example, the curvature of the bottom surface 163 and/or the curvature of the mating surface 130 can be tapered to better engage and contact the workpiece. In further examples, the bottom surface 163 and/or the mating surface 130 can include curved segments having different curvatures.

Figure 10A:
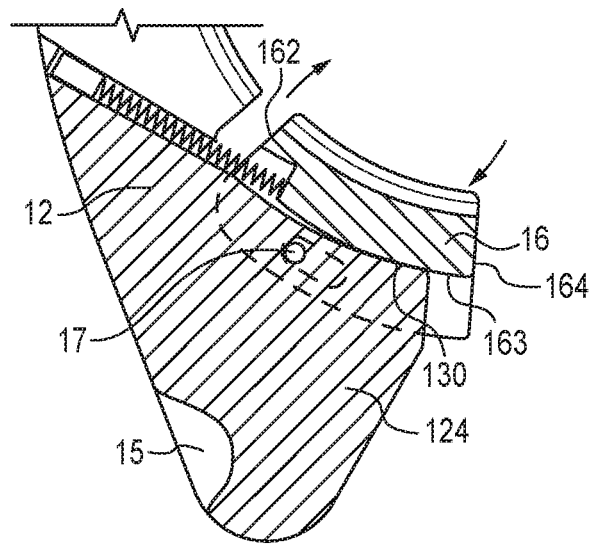
FIG. 10A is a partial cross-sectional view of a crimping member and a sliding member in accordance with an embodiment of the present disclosure, wherein the sliding member is in an initial position.
Figure 10B:
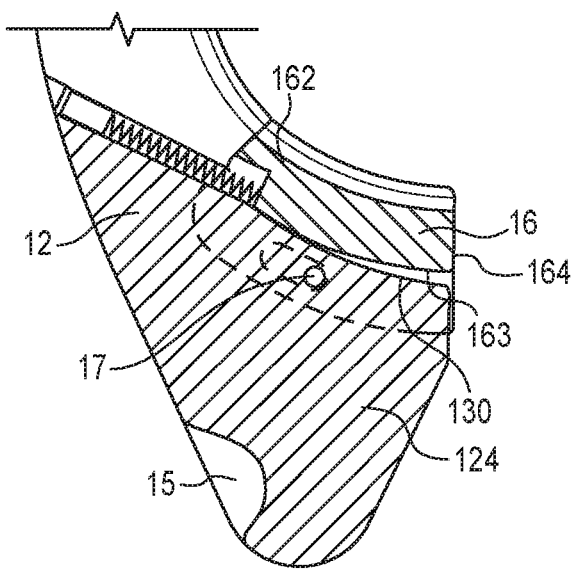
FIG. 10B is a partial cross-sectional view of a crimping member and a sliding member in accordance with an embodiment of the present disclosure, wherein the sliding member is in a crimping completed position.

Referring to FIG. 10A, that figure shows the first sliding member 16 in an initial position. In the initial position, the circumferential outer portion of the bottom surface 163 of the groove or recess 169 (portion close to the second end surface 164) is in contact with the circumferential outer portion of the mating surface 130, and the circumferential inner portion of the bottom surface 163 (close to the first end surface 162) is separated or spaced from the circumferential inner portion of the mating face 130. Referring to FIG. 10B, that figure shows that the first sliding member 16 is in the crimping completion position. In the crimping completion position, the circumferential inner portion of the bottom surface 163 of the recess 169 is in contact with the circumferential inner portion of the mating surface 130, and the circumferential outer portion of the bottom surface 163 is separated or spaced from the circumferential outer portion of the mating surface 130. As can be seen from FIGS. 10A and 10B, the first sliding member 16 self-deflects relative to the mating face 130 of the track 129 while sliding circumferentially to adaptively engage and contact the workpiece.

Therefore, the curvature of the bottom surface 163 of the recess 169 and/or the curvature of the mating surface 130 of the rail 129 may vary depending on the workpiece such that the first sliding member 16 can be adaptively deflected while sliding in the circumferential direction so that the entire inner side therefore basically contacts and engages with the workpiece.

Preferably, in order to achieve self-deflection of the first sliding member 16 relative to the rail 129, the crimping tool 10 includes only one pin 17 such that the first sliding member 16 can be adaptively rotated about the pin 17 relative to the mating surface 130. The elongated hole 167 may be located substantially in the circumferential direction near the central portion of the first sliding member 16.

Further, the pin 17 can also define the position of the first sliding member 16 relative to the first crimping member 12 in the initial position, as shown in FIGS. 3, 6B and 10A. In this way, additional components for positioning the first sliding member 16 can be omitted to further simplify the structure.

It should be understood that the crimping tool of the embodiment of the present disclosure is not limited to the examples specifically described above, and conversely, various components of the crimping tool may be variously modified as long as the crimping tool can achieve the above-described effects.

Figure 11:
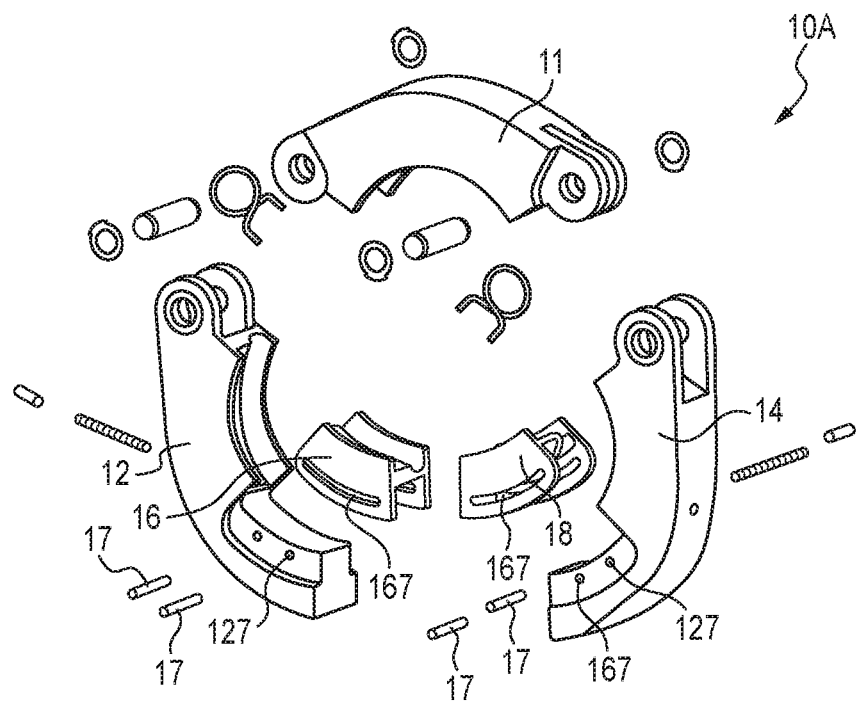
FIG. 11 is an exploded perspective view of a crimping tool in accordance with another embodiment of the present disclosure.

For example, referring to FIG. 11, that figure illustrates a crimping tool 10A in accordance with another embodiment of the present disclosure. In the crimping tool, two pins 17 are included for each sliding member 16, 18. Each sliding member 16, 18 includes an arcuate slot 167 for receiving two pins 17. Thus, the sliding stroke of each sliding member 16, 18 can be lengthened to accommodate crimping of large diameter tubular members.

Figure 12:
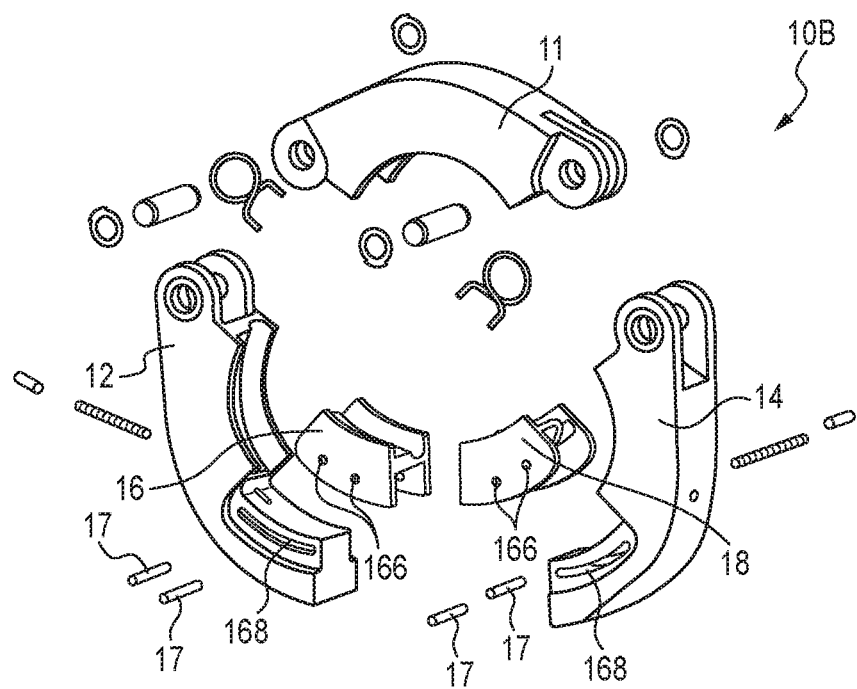
FIG. 12 is an exploded perspective view of a crimping tool in accordance with yet another embodiment of the present disclosure.

Referring to FIG. 12, that figure illustrates a crimping tool 10B in accordance with yet another embodiment of the present disclosure. In the crimping tool 10B, each sliding member 16, 18 is provided with a corresponding hole 166 for receiving the pins 17, and each crimping member 12, 14 is provided with an elongated hole 168 for allowing the pins 17 to slide therein.

In an example not shown, a guide rail for guiding the sliding of the sliding member may be disposed on the sliding member, and a groove for receiving the guide rail is provided on the crimping member. In alternative embodiments, other sliding guide structures known in the art may be used in place of the rails and grooves described above.

In the example not shown, the intermediate crimping member 11 may be omitted, or two or more intermediate crimping members 11 may be included. In other examples, the structure of the first crimping member of the crimping tool may be different from the structure of the second crimping member, and/or the structure of the intermediate crimping member may also be the same with the first crimping member or the second crimping member.

Figure 13:
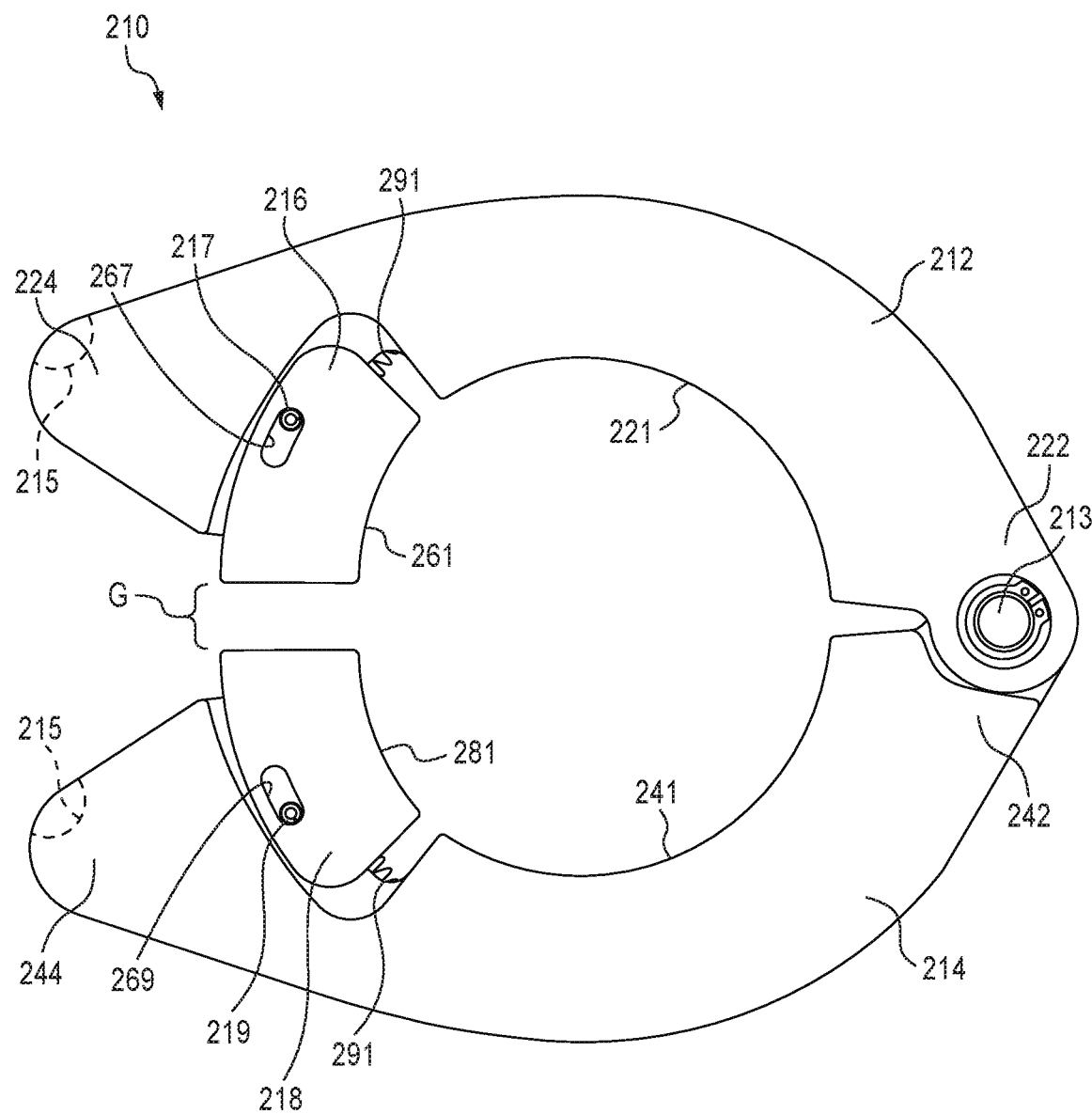
FIG. 13 is an elevational view of another embodiment of a crimping tool in accordance with the present disclosure.

FIG. 13 illustrates a crimping tool 210 comprising a first crimping member 212, and a second crimping member 214. The first crimping member 212 and the second crimping member 214 are end crimping members of the crimping tool 210 and form an opening of the crimping tool 210. In other words, the adjacent ends of the first crimping member 212 and the second crimping member 214 are not joined together, but may be moved toward each other or away from each other to close or open the crimping tool 210. The first crimping member 212 and the second crimping member 214 are each coupled to one another via a connecting device 213. The first crimping member 212 and the second crimping member 214, are each rotatable about the connecting device 213. The first crimping member 212 and the second crimping member 214, define a space (which may also be referred to as "a crimping space") for accommodating a workpiece to be crimped.

As described above, the crimping tool 210 includes the first crimping member 212 and the second crimping member 214. Further, the crimping tool 210 according to the present embodiment further includes a first sliding member 216 disposed on the first crimping member 212 and a second sliding member 218 disposed on the second crimping member 214.

Referring to FIG. 13, an end portion 222 of the first crimping member 212 is coupled to the connecting device 213. The first sliding member 216 is positioned on a free end 224 of the first crimping member 212 remote from the connecting device 213 and slidable relative to the first crimping member 212. An end portion 242 of the second crimping member 214 is connected to the connecting device 213. The second sliding member 218 is positioned on a free end 244 of the second crimping member 214 remote from the connecting device 213 and slidable relative to the second crimping member 214.

The crimping members 212 and 214, the sliding members 216 and 218, and corresponding inner sides 221, 241, 261, 281 of the crimping and sliding members together define an active surface (or crimping region) that mates and engages the workpiece to be crimped. The structure of the active surface (or crimping area) can be determined according to the structure of the workpiece to be crimped. In the illustrated example, the workpiece to be crimped is a tubular member having a circular outer surface, and thus, the inner sides 221, 241 of the crimping members 212, 214 and the inner sides 261, 281 of the sliding members 216, 218 define a substantially circular active surface (or pressure) connected area, as shown in FIG. 13. It should be understood that the crimping tool according to the present disclosure is not limited to crimping a tubular member having a circular cross section.

The first sliding member 216 is adjacent to the second sliding member 218. When the crimping tool 210 is in the initial position at which the workpiece is not crimped, the distance between the first sliding member 216 and the second sliding member 218 is smaller than the distance between the free end 224 of the first crimping member 212 and the free end 244 of the second crimping member 214. Thus, when the workpiece to be crimped is placed in the crimping space defined by the crimping members 212, 214 and the sliding members 216, 218, although the free end 224 of the first crimping member 212 is moved toward the free end 244 of the second crimping member 214, the free ends 224, 244 of the members 212, 214 do not abut or close. However the sliding members 216, 218 will contact the workpiece, thereby applying a more uniform pressure to the workpiece.

When the crimping tool 210 crimps a workpiece, the first sliding member 216 and the second sliding member 218 are brought toward each other as the first crimping member 212 and the second crimping member 214 are brought closer together. The end portion 222 of the first crimping member 212 is moved substantially in the circumferential direction, and the second sliding member 218 is moved substantially toward the end portion 242 of the second crimping member 214 in the circumferential direction. Similarly, the end portion 242 of the second crimping member 214 is moved substantially in the circumferential direction, and the first sliding member 216 is moved substantially toward the end portion 222 of the first crimping member 212 in the circumferential direction. Thus, the crimping tool 210 according to the present disclosure can prevent or reduce burrs formed on the workpiece as compared with prior art crimping tools without a sliding member. To this end, it is preferable that a gap G exists between the first sliding member 216 and the second sliding member 218 when the crimping tool 210 is in the initial position as shown in FIG. 13. When the crimping tool 210 is in the crimping completion position (similar to the position shown in FIG. 4), the crimping members 212, 214 and the sliding members 216, 218 abut each other to form a substantially continuous active surface.

In the crimping tool 210 according to the present disclosure, only two sliding members 216 and 218 are included, which are respectively disposed on the two crimping members 212 and 214 forming the opening of the crimping tool. Therefore, the crimping tool 210 according to the present disclosure has a simple structure and can improve the crimping performance.

The connecting device 213 is configured to connect adjacent crimp members together to form the crimping tool 210 and to allow the crimp members to rotate toward one another or away from each other. The connecting device 213 includes an assembly as previously described herein with regard to FIG. 5. Thus, typically, the connecting device 213 comprises a hinge pin and an elastic member as previously described with regard to FIG. 5. And, the noted crimping members define corresponding through holes for inserting the hinge pin and the elastic member. As previously described, this assembly applies a biasing force to the noted crimping members toward their initial positions.

In addition, in certain versions, the first crimping member 212 and the second crimping member 214 are provided with guide rails, such as guide rail 129 described in association with FIG. 8A. And in such versions, the first and second sliding members 216, 218 are provided with grooves or recesses for engagement with a corresponding guide rail. The recesses can be in the form of previously described recesses 169 shown in FIG. 9A for example. As will be understood, the guide rail typically defines a mating surface in sliding contact with a bottom surface of the groove or recess. This configuration is previously described herein. In particular versions, the mating surface and the bottom surface are curved surfaces. And in specific versions, the curvature of the mating surface of the rail is less than or equal to the curvature of the bottom surface of the groove. As previously described, the curvature of the mating surface is constant or may be varied.

The first sliding member 216 also includes an elongated aperture or hole 267 for receiving a pin 217. Similarly, the second sliding member 218 also includes an elongated aperture or hole 269 for receiving a pin 219. The pins 217, 219 extend from the corresponding first and second crimping members 212, 214. As previously noted, the pins and apertures could be reversed such that one or both of the pins could extend from sliding member(s) and the aperture(s) are defined in corresponding crimping members. In many versions, the crimping tool 210 includes only one pin for each of the first and second sliding members so that the members are adaptively rotatable about the corresponding pin during crimping.

Additional details of the pins, elongated openings, and sliding members are as previously described herein with regard to other embodiments.

The crimping tool 210 can also include one or more biasing members 291 which can be a spring. One end of the biasing member 291 is connected to the first sliding member 216 and the other end is connected to or engaged with a plug (see for example the use of a plug in association with FIGS. 5, 6A, and 6B), or with the first crimping member 212. A similar assembly can be used with the second sliding member 218. Typically, the biasing members 291 are configured to bias the sliding members 216, 218 in their initial positions.

In many versions, the crimping tool also defines recesses 215 in each of its first and second crimping members 212, 214. The recesses 215 are similar to previously described recesses 15 and constitute a drive joint that engages with a drive unit such as previously described drive unit 20. As previously noted, the drive joint can be in the form of recess(es) and/or projection(s) at a free end of a corresponding crimping member.

Figure 14:
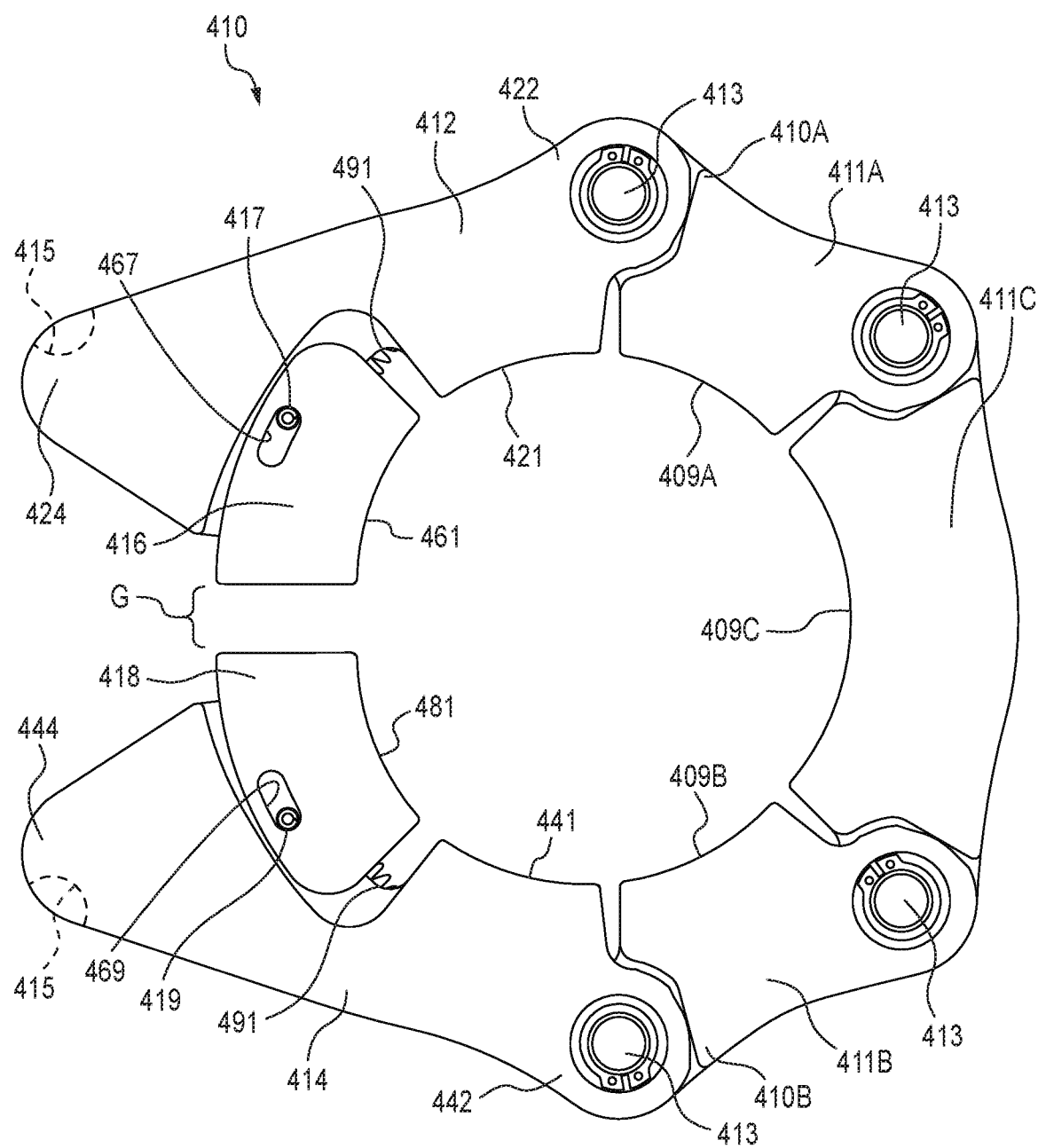
FIG. 14 is an elevational view of another embodiment of a crimping tool in accordance with the present disclosure.

FIG. 14 illustrates a crimping tool 410 comprising a first crimping member 412, a second crimping member 414, and a first, a second, and a third immediate crimping member 411A, 411B, and 411C respectively, disposed between the first crimping member 412 and the second crimping member 414. The first crimping member 412 and the second crimping member 414 are end crimping members of the crimping tool 410 and form an opening of the crimping tool 410. In other words, the adjacent ends of the first crimping member 412 and the second crimping member 414 are not joined together, but may be moved toward each other or away from each other to close or open the crimping tool 410. The first crimping member 412 and the second crimping member 414 are each coupled to the intermediate crimping members 411A, 411B, and 411C via connecting devices 413. The first crimping member 412, the second crimping member 414, and the intermediate crimping members 411A, 411B, and 411C are each rotatable about corresponding connecting devices 413. The first crimping member 412, the second crimping member 414, and the intermediate crimping members 411A, 411B, and 411C define a space (which may also be referred to as "a crimping space") for accommodating a workpiece to be crimped.

As previously described, the first crimping member 412 and the second crimping member 414 surround the corresponding connecting devices 413 with respect to the intermediate crimping members 411A, 411B, and 411C at an initial position and a crimping completion position. Rotation between these positions achieves a crimping of the workpiece.

As described above, the crimping tool 410 includes the first crimping member 412, the second crimping member 414, and the intermediate crimping members 411A, 411B, and 411C. Further, the crimping tool 410 according to the present embodiment further includes a first sliding member 416 disposed on the first crimping member 412 and a second sliding member 418 disposed on the second crimping member 414.

Referring to FIG. 14, an end portion 422 of the first crimping member 412 is coupled to an end portion 410A of the first intermediate crimping member 411A via a connecting device 413. The first sliding member 416 is positioned on a free end 424 of the first crimping member 412 remote from the connecting device 413 and slidable relative to the first crimping member 412. An end portion 442 of the second crimping member 414 is connected to another end portion 410B of the second intermediate crimping member 411B via a connecting device 413. The second sliding member 418 is positioned on a free end 444 of the second crimping member 414 remote from the connecting device 413 and slidable relative to the second crimping member 414.

The crimping members 411A, 411B, 411C, 412, 414, the sliding members 416 and 418, and corresponding inner sides 409A, 409B, 409C, 421, 441, 461, and 481 of the crimping and sliding members together define an active surface (or crimping region) that mates and engages the workpiece to be crimped. The structure of the active surface (or crimping area) can be determined according to the structure of the workpiece to be crimped. In the illustrated example, the workpiece to be crimped is a tubular member having a circular outer surface, and thus, the inner sides of the crimping members 411A, 411B, 411C, 412, 414 and the sliding members 416, 418 define a substantially circular active surface (or pressure) connected area, as shown in FIG. 14. It should be understood that the crimping tool according to the present disclosure is not limited to crimping a tubular member having a circular cross section.

The first sliding member 416 is adjacent to the second sliding member 418. When the crimping tool 410 is in the initial position at which the workpiece is not crimped, the distance between the first sliding member 416 and the second sliding member 418 is smaller than the distance between the free end 424 of the first crimping member 412 and the free end 444 of the second crimping member 414. Thus, when the workpiece to be crimped is placed in the crimping space defined by the crimping members 411A, 411B, 411C, 412, 414 and the sliding members 416, 418, although the free end 424 of the first crimping member 412 is moved toward the free end 444 of the second crimping member 414, the free ends 424, 444 of the members 412, 414 do not abut or close. However the sliding members 416, 418 will contact the workpiece, thereby applying a more uniform pressure to the workpiece.

When the crimping tool 410 crimps a workpiece, the first sliding member 416 and the second sliding member 418 are brought toward each other as the first crimping member 412 and the second crimping member 414 are brought closer together. The end portion 422 of the first crimping member 412 is moved substantially in the circumferential direction, and the second sliding member 418 is moved substantially toward the end portion 442 of the second crimping member 414 in the circumferential direction. Similarly, the end portion 442 of the second crimping member 414 is moved substantially in the circumferential direction, and the first sliding member 416 is moved substantially toward the end portion 422 of the first crimping member 412 in the circumferential direction. Thus, the crimping tool 410 according to the present disclosure can prevent or reduce burrs formed on the workpiece as compared with prior art crimping tools without a sliding member. To this end, it is preferable that a gap G exists between the first sliding member 416 and the second sliding member 418 when the crimping tool 410 is in the initial position as shown in FIG. 14. When the crimping tool 10 is in the crimping completion (similar to the position as shown in FIG. 4), the crimping members 412, 414 and the sliding members 416, 418 abut each other to form a substantially continuous active surface. In many applications, prior to crimping, the first sliding member 416 and the second sliding member 418 define a predetermined gap G, and at the end of the workpiece crimping, the inner surfaces of the first crimping member 412, the second crimping member 414, the first intermediate crimping member 411A, the second intermediate crimping member 411B, and the third intermediate crimping member 411C form a continuous active surface.

In the crimping tool 410 according to the present disclosure, only two sliding members 416 and 418 are included, which are respectively disposed on the two crimping members 412 and 414 forming the opening of the crimping tool. Therefore, the crimping tool 410 according to the present disclosure has a simple structure and can improve the crimping performance.

The connecting device 413 is configured to connect adjacent crimp members together to form the crimping tool 410 and to allow the crimp members to rotate toward one another or away from each other. The connecting device 413 includes an assembly as previously described herein with regard to FIG. 5. Thus, typically, the connecting device 413 comprises a hinge pin and an elastic member as previously described with regard to FIG. 5. And, the noted crimping members and intermediate members define corresponding through holes for inserting the hinge pin and the elastic member. As previously described, this assembly applies a biasing force to the noted crimping members and intermediate members toward their initial positions.

In addition, in certain versions, the first crimping member 412 and the second crimping member 414 are provided with guide rails, such as guide rail 129 described in association with FIG. 8A. And in such versions, the first and second sliding members 416, 418 are provided with grooves or recesses for engagement with a corresponding guide rail. The recesses can be in the form of previously described recesses 169 shown in FIG. 9A for example. As will be understood, the guide rail typically defines a mating surface in sliding contact with a bottom surface of the groove or recess. This configuration is previously described herein. In particular versions, the mating surface and the bottom surface are curved surfaces. And in specific versions, the curvature of the mating surface of the rail is less than or equal to the curvature of the bottom surface of the groove. As previously described, the curvature of the mating surface is constant or may be varied.

The first sliding member 416 also includes an elongated aperture or hole 467 for receiving a pin 417. Similarly, the second sliding member 418 also includes an elongated aperture or hole 469 for receiving a pin 419. The pins 417, 419 extend from the corresponding first and second crimping members 412, 414. As previously noted, the pins and apertures could be reversed such that one or both of the pins could extend from sliding member(s) and the aperture(s) are defined in corresponding crimping members. In many versions, the crimping tool 410 includes only one pin for each of the first and second sliding members so that the members are adaptively rotatable about the corresponding pin during crimping.

Additional details of the pins, elongated openings, and sliding members are as previously described herein with regard to other embodiments.

The crimping tool 410 can also include one or more biasing members 491 which can be a spring. One end of the biasing member 491 is connected to the first sliding member 416 and the other end is connected to or engaged with a plug (see for example the use of a plug in association with FIGS. 5, 6A, and 6B), or with the first crimping member 412. A similar assembly can be used with the second sliding member 418. Typically, the biasing members 491 are configured to bias the sliding members 416, 418 in their initial positions.

In many versions, the crimping tool also defines recesses 415 in each of its first and second crimping members 412, 414. The recesses 415 are similar to previously described recesses 15 and constitute a drive joint that engages with a drive unit such as previously described drive unit 20. As previously noted, the drive joint can be in the form of recess(es) and/or projection(s) at a free end of a corresponding crimping member.

The crimping tools of the present subject matter can comprise a number of crimping members. Typically, the crimping tools comprise a first and a second crimping member each with a corresponding first and second sliding member disposed thereon. The crimping tools also comprise at least one intermediate crimping member. The total number of intermediate crimping members can range from one to ten or more.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features. In addition, a feature of one embodiment can be used with or incorporated in, another embodiment.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A crimping ring comprising:
a first crimping member having a first free end;
a second crimping member having a second free end, the first free end and the second free end forming an opening of the crimping ring;
at least one intermediate crimping member,
wherein the first crimping member, the at least one intermediate crimping member, and the second crimping member are sequentially hinged together via connecting devices;

a first sliding member, the first sliding member being slidably disposed on the first free end of the first crimping member;

a second sliding member slidably disposed on the second free end of the second crimping member;

wherein the connecting devices each comprise a hinge pin and an elastic member, each of the first crimping member, the at least one intermediate crimping member, and the second crimping member defining a through hole for inserting the hinge pin and the elastic member applies a biasing force to the first crimping member, the at least one intermediate crimping member, and the second crimping member toward their initial positions;

wherein the initial positions of the first crimping member, the at least one intermediate crimping member and the second crimping member is the open position of the crimping ring.

2. The crimping ring according to claim 1, wherein the first crimping member has the same structure as the second crimping member, and the first sliding member has the same structure as the second sliding member.

3. The crimping ring according to claim 1, wherein the first crimping member and the second crimping member are provided with a guide rail, and the first sliding member and the second sliding member are provided with a groove that engages with the guide rail.

4. The crimping ring according to claim 1 wherein the at least one intermediate crimping member includes a total of from one to ten crimping members.

5. A crimping ring comprising:

a first crimping member having a first free end;

a second crimping member having a second free end, the first free end and the second free end forming an opening of the crimping ring;

a first intermediate crimping member;

a second intermediate crimping member;

a third intermediate crimping member;

wherein the first crimping member, the first intermediate crimping member, the third intermediate crimping member, the second intermediate crimping member, and the second crimping member are sequentially hinged together via connecting devices;

a first sliding member, the first sliding member being secured to and slidably disposed along a curved mating surface on the first free end of the first crimping member;

a second sliding member secured to and slidably disposed along a curved mating surface on the second free end of the second crimping member, wherein (i) the first sliding member is adjacent to the second sliding member, and (ii) the first crimping member, the first intermediate crimping member, the third intermediate crimping member, the second intermediate crimping member, the second crimping member, the first slide member and the second slide member form an active surface that contacts a workpiece to be pressed;

wherein each of the connecting devices comprises a hinge pin and an elastic member in the form of a torsion spring, and the elastic member applies a biasing force to the first crimping member, the first intermediate crimping member, the second intermediate crimping member, the third intermediate crimping member, and the second crimping member toward their initial positions.

6. The crimping ring according to claim 5, wherein the first crimping member, the second crimping member, the first intermediate crimping member, the second intermediate crimping member, the third intermediate crimping member, the first sliding member, and the second sliding member form a substantially circular active surface.

7. The crimping ring according to claim 6, wherein the first sliding member is configured to be slidable in a circumferential direction with respect to the first crimping member, and the second sliding member is configured to be slidable in the circumferential direction with respect to the second crimping member.

8. The crimping ring according to claim 7, wherein the first sliding member is configured to be adaptive with respect to the first crimping member while sliding in the circumferential direction and rotating so that an entire inner side of the first sliding member substantially engages and contacts the workpiece.

9. The crimping ring according to claim 8, wherein the second sliding member is configured to be adaptive with respect to the second crimping member while sliding in the circumferential direction and rotating so that an entire inner side of the second sliding member substantially engages and contacts the workpiece.

10. The crimping ring according to claim 5, wherein the first crimping member has the same structure as the second crimping member, and the first the sliding member has the same structure as the second sliding member.

11. The crimping ring according to claim 5, wherein the first crimping member and the second crimping member are provided with a guide rail, and the first sliding member and the second sliding member are provided with a groove that engages with the guide rail.

12. The crimping ring according to claim 11, wherein the guide rail defines the mating surface in sliding contact with a bottom surface of the groove.

13. The crimping ring according to claim 12, wherein the mating surface and the bottom surface are curved surfaces.

14. The crimping ring according to claim 13, wherein the curvature of the mating surface of the rail is less than or equal to the curvature of the bottom surface of the groove.

15. The crimping ring according to claim 13, wherein the curvature of the mating surface is constant.

16. The crimping ring according to claim 13, wherein the curvature of the mating surface is varied.

17. The crimping ring according to claim 5, the crimping tool further comprising at least one pin coupled to each of the respective first crimping member and the second crimping member, wherein one of the first crimping member and the first sliding member provided with a hole for receiving and holding the at least one pin, and the other of the first crimping member and the first sliding member provided with an elongated hole to allow the at least one pin to move therein, and wherein one of the second crimping member and the second sliding member provided with a hole for receiving and holding the at least one pin, the other of the second crimping member and the second sliding member provided to allow the at least one pin to move therein.

18. The crimping ring according to claim 17, wherein the crimping tool includes one pin for each of the first sliding member and the second sliding member, wherein the first sliding member and the second sliding member are adaptively rotatable about the one pin when the workpiece is crimped.

19. The crimping ring according to claim 17, wherein the at least one pin is configured to define an initial position of the first sliding member and the second sliding member when the workpiece is not crimped.

20. The crimping ring according to claim 5, wherein each of the first sliding member and the second sliding member also includes a biasing member configured to bias the sliding member toward an initial position.

21. The crimping ring according to claim 20, wherein each of the first crimping member and the second crimping member is provided with provisions for receiving and holding the biasing member.

22. The crimping ring according to claim 5, wherein the crimping tool is configured such that prior to workpiece crimping, the first sliding member and the second sliding member define a predetermined gap (G), and at the end of the workpiece crimping the inner surfaces of the first crimping member, the second crimping member, the first intermediate crimping member, the second intermediate crimping member, and the third intermediate crimping member form a continuous active surface.

23. The crimping ring according to claim 5, wherein each of the first crimping member and the second crimping member includes a drive joint for engaging a drive device.

24. The crimping ring according to claim 23, wherein the drive joint of each of the first and the second crimping members is in the form of either a recess or a projection at a free end of each of the first and the second crimping members.

25. A crimping ring comprising:
a first crimping member;
a second crimping member adjacent to the first crimping member, adjacent corresponding ends of the first crimping member and the second crimping member being hinged together via a connecting device;
a first sliding member, the first sliding member being secured to and slidably disposed along a curved mating surface on the first crimping member on a free end of the first crimping member; and
a second sliding member secured to and slidably disposed along a curved mating surface on a free end of the second crimping member,
wherein (i) the first sliding member is adjacent to the second sliding member, and wherein (ii) the first crimping member, the second crimping member, the first sliding member and the second sliding member form an active surface that contacts a workpiece to be crimped,
wherein the first crimping member and the second crimping member are provided with a guide rail, and the first sliding member and the second sliding member are provided with a groove that engages with the guide rail;
wherein the guide rail has a mating surface in sliding contact with a bottom surface of the groove;
wherein each of the first sliding member and the second sliding member also includes a biasing member configured to bias the sliding member toward an initial position;
wherein each of the first crimping member and the second crimping member is provided with provisions for receiving and holding the biasing member.

26. The crimping ring according to claim 25, wherein the first crimping member, the second crimping member, the first sliding member and the second sliding member form a substantially circular active surface.

27. The crimping ring according to claim 26, wherein the first sliding member is configured to be slidable in a circumferential direction with respect to the first crimping member, and the second sliding member is configured to be slidable in the circumferential direction with respect to the second crimping member.

28. The crimping ring according to claim 27, wherein the first sliding member is configured to be adaptive with respect to the first crimping member while sliding in the circumferential direction and rotating so that an entire inner side of the first sliding member substantially engages and contacts the workpiece.

29. The crimping ring according to claim 28, wherein the second sliding member is configured to be adaptive with respect to the second crimping member while sliding in the circumferential direction and rotating so that an entire inner side of the second sliding member substantially engages and contacts the workpiece.

30. The crimping ring according to claim 25, wherein the connecting device comprises a hinge pin and an elastic member, each of the first crimping member, the second crimping member defining a through hole for inserting the hinge pin and the elastic member applies a biasing force to the first crimping member, the second crimping member toward their initial positions.

31. The crimping ring according to claim 25, wherein the first crimping member has the same structure as the second crimping member, and the first the sliding member has the same structure as the second sliding member.

32. The crimping ring according to claim 25, wherein the mating surface and the bottom surface are curved surfaces.

33. The crimping ring according to claim 32, wherein the curvature of the mating surface of the rail is less than or equal to the curvature of the bottom surface of the groove.

34. The crimping ring according to claim 32, wherein the curvature of the mating surface is constant.

35. The crimping ring according to claim 32, wherein the curvature of the mating surface is varied.

36. The crimping ring according to claim 25, the crimping ring further comprising at least one pin coupled to each of the respective first crimping member and the second crimping member,
wherein one of the first crimping member and the first sliding member provided with a hole for receiving and holding the at least one pin, and the other of the first crimping member and the first sliding member provided with an elongated hole to allow the at least one pin to move therein, and
wherein one of the second crimping member and the second sliding member provided with a hole for receiving and holding the at least one pin, the other of the second crimping member and the second sliding member provided to allow the at least one pin to move therein.

37. The crimping ring according to claim 36, wherein the crimping ring includes one pin for each of the first sliding member and the second sliding member, wherein the first sliding member and the second sliding member are adaptively rotatable about the gone pin when the workpiece is crimped.

38. The crimping ring according to claim 36, wherein the at least one pin is configured to define an initial position of the first sliding member and the second sliding member when the workpiece is not crimped.

39. The crimping ring according to claim 25, wherein the crimping ring is configured such that prior to workpiece crimping, the first sliding member and the second sliding member define a predetermined gap (G), and at the end of the workpiece crimping the inner surfaces of the first crimping member, and the second crimping member form a continuous active surface.

40. The crimping ring according to claim 25, wherein each of the first crimping member and the second crimping member includes a drive joint for engaging a drive device.

41. The crimping ring according to claim 40, wherein the drive joint of each of the first and the second crimping members is in the form of either a recess or a projection at a free end of each of the first and the second crimping members.

\* \* \* \* \*